US012524431B2

(12) United States Patent
Gupta et al.

(10) Patent No.: US 12,524,431 B2
(45) Date of Patent: Jan. 13, 2026

(54) SEMANTICALLY SIMILAR HISTORICAL EXAMPLE BASED DATA TRANSFORMATION

(71) Applicant: International Business Machines Corporation, Armonk, NY (US)

(72) Inventors: Nitin Gupta, Saharanpur (IN); Shramona Chakraborty, Howrah (IN); Hima Patel, Bengaluru (IN); Nagarjuna Surabathina, Prakasam(dt) (IN); Sameep Mehta, Bangalore (IN); Ramkumar Ramalingam, Theni (IN); Matu Agarwal, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/411,669

(22) Filed: Jan. 12, 2024

(65) Prior Publication Data
US 2025/0231958 A1 Jul. 17, 2025

(51) Int. Cl.
*G06F 16/25* (2019.01)

(52) U.S. Cl.
CPC .................. *G06F 16/258* (2019.01)

(58) Field of Classification Search
CPC .................................................... G06F 16/258
See application file for complete search history.

(56) References Cited

U.S. PATENT DOCUMENTS

| 2010/0138311 | A1* | 6/2010 | Pieraldi | G06Q 50/18 |
| | | | | 705/26.1 |
| 2010/0191760 | A1* | 7/2010 | Kusumura | G06F 16/258 |
| | | | | 707/767 |
| 2013/0326347 | A1* | 12/2013 | Albright | G06F 9/454 |
| | | | | 715/265 |

(Continued)

OTHER PUBLICATIONS ip.com, System and Methods for Incremental Learning of Business Context from Enterprise Data Mapping for Application Integration Domain, May 21, 2022.

(Continued)

*Primary Examiner* — Van H Oberly
*Assistant Examiner* — Brooks T Hale
(74) *Attorney, Agent, or Firm* — Garg Law Firm, PLLC; Rakesh Garg; Lily Neff

(57) ABSTRACT

An embodiment computes a plurality of similarity scores, each similarity score in the plurality of similarity scores measuring a similarity of task data of a first data transformation task to data of a stored data transformation in a plurality of stored data transformations, wherein each of the plurality of stored data transformations comprises a stored data transformation program, each stored data transformation program comprising a data transformation from a first data format to a second data format. An embodiment generates, from a first stored data transformation program in the plurality of stored data transformations, a generated data transformation program. An embodiment performs, by modifying a plurality of records described by the first data (Continued)

transformation task into a second plurality of records according to the generated data transformation program, the first data transformation task.

20 Claims, 9 Drawing Sheets

(56) References Cited

U.S. PATENT DOCUMENTS

| | | | |
|---|---|---|---|
| 2020/0193239 A1* | 6/2020 | Wilson | G06F 16/38 |
| 2021/0149907 A1 | 5/2021 | Murray et al. | |
| 2021/0365252 A1* | 11/2021 | Kawakami | G06F 8/40 |
| 2023/0137639 A1 | 5/2023 | Makhija et al. | |
| 2023/0169070 A1 | 6/2023 | Ramalingam et al. | |

OTHER PUBLICATIONS

Mulesoft, Get a Recommendation for Mapping Data Types for a Transformation, 2023, https://docs.mulesoft.com/design-center/get-mapping-recommendations.

Workato, Group Data Mapping, Dec. 20, 2022, https://docs.workato.com/recipes/group-data-mapping.html#activate-the-group-mapping-wizard.

Snaplogic, SnapLogic TechTalk—Data Transformations and Mappings, 2023, https://www.snaplogic.com/blog/snaplogic-techtalk-data-transformations-and-mappings.

Natani et al., "Knowledge Graph-based Data Transformation Recommendation Engine", 2021 IEEE International Conference on Big Data (Big Data), 2021, pp. 4617-4623, doi: 10.1109/BigData52589.2021.9671905.

Transform Data by Example, Microsoft, May 17, 2017, 4 pages, doi: https://www.microsoft.com/en-us/research/project/transform-data-by-example/.

Wu et al., "Explainable data transformation recommendation for automatic visualization", Frontiers of Information Technology & Electronic Engineering, Dec. 23, 2022, pp. 1007-1027, vol. 24, doi: https://doi.org/10.1631/FITEE.2200409.

* cited by examiner

SEMANTICALLY SIMILAR HISTORICAL EXAMPLE BASED DATA TRANSFORMATION

BACKGROUND

The present invention relates generally to dataset management. More particularly, the present invention relates to a method, system, and computer program for semantically similar historical example based data transformation.

In a dataset, data is typically organized in two-dimensional tables. Rows of a table store individual records, and columns of a table store a particular portion of data for each record. For example, each row of a table might each store data referring to a particular customer, with different column (also referred to as attributes) storing a customer's name, address, telephone number, and customer identification number.

Data transformation is a process of converting data from one format, standard, or structure to another, or extracting data from a portion of a record, without changing the data itself. Data transformation is typically used to prepare data for another use, to merge data from disparate sources into a single dataset, or to improve data quality by standardizing records to a particular format or consolidating duplicate data records. Standardizing records to a particular format is particularly important in preparing a dataset to be processed through feature extraction modules, classifiers, or other machine learning based techniques, which can lose accuracy when data is presented differently, even when the data actually refers to the same thing. For example, data collected in the United States might use the MM/DD/YYYY date format, while data collected in Europe might use the DD/MM/YYYY format, while some data might use two digits instead of four for the year. Thus, data transformation might be used to identify records including a date, and convert the identified records to a single consistent format. A data transformation is also referred to as a mapping, and one or more instructions used to perform a data transformation are referred to as a program.

SUMMARY

The illustrative embodiments provide for semantically similar historical example based data transformation. An embodiment includes computing a plurality of similarity scores, each similarity score in the plurality of similarity scores measuring a similarity of task data of a first data transformation task to data of a stored data transformation in a plurality of stored data transformations, wherein each of the plurality of stored data transformations comprises a stored data transformation program, each stored data transformation program comprising a data transformation from a first data format to a second data format. An embodiment includes generating, from a first stored data transformation program in the plurality of stored data transformations, a generated data transformation program. An embodiment includes performing, by modifying a plurality of records described by the first data transformation task into a second plurality of records according to the generated data transformation program, the first data transformation task. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
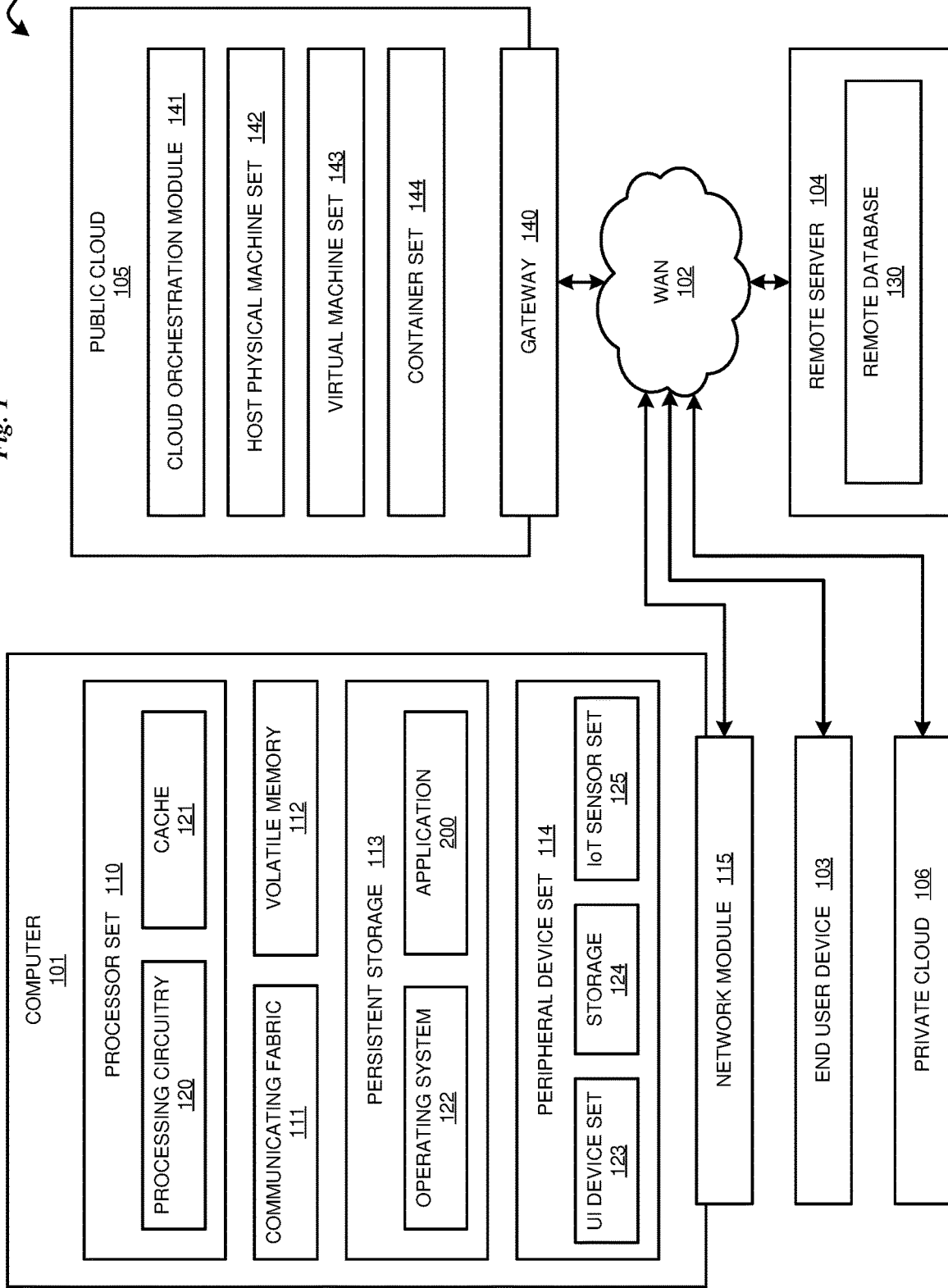
FIG. 1 depicts a block diagram of a computing environment in accordance with an illustrative embodiment.

Applications to connect one dataset to another and perform data transformations are currently available. Configuring a data transformation in these applications typically includes identifying the correct mapping from source to target attributes, manually providing one or more samples, or examples, of the mapping, and generating a program (either by a user, or automatically from the provided samples), to perform the transformation. Verifying that the transformation has been executed correctly, especially for edge cases, is also desirable.

However, the illustrative embodiments recognize that it is difficult for a user, especially one who is unfamiliar with the peculiarities of a particular dataset, to identify which transformations are required, to provide appropriate samples, and to ensure that the transformation is performing correctly. Existing applications often do not provide for program reuse, and even if reuse is possible a human user must determine which program to reuse, and how to adapt a program being reused, if necessary. Writing programs manually and providing appropriate samples is also time consuming, and subject to trial and error as the user applies a program and validates the results. Thus, the illustrative embodiments recognize that there is an unmet need to derive programs from past successful programs, using metadata and samples derived from a dataset to be transformed, and to execute derived programs automatically if desired.

The present disclosure addresses the deficiencies described above by providing a process (as well as a system, method, machine-readable medium, etc.) that computes a plurality of similarity scores measuring a similarity of task data of a first data transformation task to data of a stored data transformation; generates, from a first stored data transformation program in the plurality of stored data transformations, a generated data transformation program; and performs, by modifying a plurality of records described by the first data transformation task into a second plurality of records according to the generated data transformation program, the first data transformation task. Thus, the illustrative embodiments provide for semantically similar historical example based data transformation.

An illustrative embodiment has access to stored data transformations, for use as historical examples. A stored data transformation includes a stored data transformation program, instructions for executing a data transformation from a first data format to a second data format. A stored data transformation also includes metadata of the data transformation, such as one or more of the name, text description, or fingerprint of the columns that are the subject of the transformation, or samples (i.e., examples) of the transformation. For example, if a stored data transformation is to extract a city name from a meeting address, the source column name might be "event" and the target column name might be "city". For the same example, the source column description might be "event address" and the target column name might be "city where event will occur". A fingerprint is a pattern or template of the data stored in a particular column. For example, a column holding dates might have a fingerprint of "DD/MM/YYYY" or "MM/DD/YYYY". Other metadata is also possible and contemplated within the scope of the illustrative embodiments.

An embodiment uses a presently available embedding technique to represent the metadata, or a particular type of metadata, of a stored data transformation, with one or more embeddings. An embedding is a multidimensional numerical representation of a portion of data. Presently available embedding techniques, such as word2vec and the like, are trained to generate an embedding correspond to a word or group of words. The more similar two embeddings are to each other, as measured by closeness in a vector space, the more semantically similar the word or words corresponding to each embedding are to each other. For example, the embeddings corresponding to "cat" and "kitten" might be more similar to each other than the embeddings corresponding to "cat" and "desk", because a cat and a kitten are considered more semantically similar to each other than a cat and a desk are. One presently available technique for measuring embedding similarity is cosine similarity. Other embedding similarity measurement techniques are also possible and contemplated within the scope of the illustrative embodiments.

An embodiment forms clusters of sufficiently similar embeddings representing metadata, or a particular type of metadata, of stored data transformations. One embodiment forms clusters of sufficiently similar embeddings in multiple embedding spaces, each corresponding to a particular type of metadata, of stored data transformations. One example embodiment might use embedding spaces each corresponding to one of the name, text description, fingerprint of the columns of stored data transformations, and samples.

An embodiment receives a data transformation task to be performed, using one or more stored data transformations as examples. The data transformation task includes metadata of the data transformation, such as one or more of the name, text description, or fingerprint of the columns that are the subject of the transformation, or samples of the desired transformation.

An embodiment uses a presently available embedding technique to represent the metadata, or a particular type of metadata, of a data transformation task, with one or more embeddings. Typically, an embodiment uses the same embedding technique on both the stored data transformations and the data transformation task, so that the resulting embeddings can be compared to each other.

An embodiment computes a plurality of similarity scores. Each similarity score measures a similarity of task data of a data transformation task to data of a stored data transformation. In one embodiment, each similarity score measures a similarity of a metadata embedding of a data transformation task to a metadata embedding of one or a cluster of stored data transformations. In one embodiment, each similarity score measures a similarity of a particular type of metadata embedding (e.g., a name, text description, fingerprint of the columns that are the subject of the transformation, or samples) of a data transformation task to a corresponding embedding of one or a cluster of stored data transformations. In one embodiment, if a similarity score to a cluster of stored data transformations is above a threshold value, the embodiment identifies one or more stored data transformations within the cluster that are most similar to the data transformation task, and adds the identified stored data transformations to a set of candidate stored data transformations. In another embodiment, if a similarity score to each of more than one cluster of stored data transformations is above a threshold value, the embodiment identifies one or more stored data transformations within each cluster that are most similar to the data transformation task, and adds the identified stored data transformations to a set of candidate stored data transformations. Another embodiment does not use clusters, and uses the similarity scores to identify one or more stored data transformations within each cluster that are most similar to the data transformation task, and adds the identified stored data transformations to a set of candidate stored data transformations.

An embodiment ranks the set of candidate stored data transformations according to one or more ranking schemes. For example, one ranking scheme might rank candidate stored data transformations according to their name similarity, another ranking scheme might rank candidate stored data transformations according to their text description similarity, another ranking scheme might rank candidate stored data transformations according to their fingerprint similarity, and another ranking scheme might rank candidate stored data transformations according to their sample similarity. If there are multiple ranking schemes, an embodiment aggregates the rankings into a combined ranked set of candidate stored data transformations. One embodiment aggregates the rankings into a combined ranked set of candidate stored data transformations by computing a weighted sum of the individual rankings, or by computing a weighted sum of the individual embedding-specific similarity scores for a candidate stored data transformation and ranking the candidate stored data transformations according to each transformation's corresponding weighed sum.

An embodiment generates a generated data transformation program from a candidate stored data transformation in the set of candidate stored data transformations. In particular, there might be only one candidate stored data transformation in the set of candidate stored data transformations with a similarity score above a highest threshold value, indicating that this candidate stored data transformation's program is usable to perform the data transformation task. In this case, an embodiment uses candidate stored data transformation's program as the generated data transformation program.

There might be more than one candidate stored data transformation in the set of candidate stored data transformations with a similarity score above a second threshold value, equal to or lower than the first threshold value, indicating that the programs of these candidate stored data transformations are usable to perform the data transformation task with a delimiter or other minor adjustment. For example, there might be two candidate stored data transformations that extract a month from a date, but in one the month precedes the day of the month and in the other the month-day order is reversed. In this case, an embodiment uses an adjusted version of one of the candidate stored data transformation's program as the generated data transformation program. As another example, there might be two candidate stored data transformations that extract a month from a date, but in one slashes are used to delimit fields within the date, and in the other spaces are used to delimit fields within the date. In this case, an embodiment uses an adjusted version of one of the candidate stored data transformation's program as the generated data transformation program—for example, by changing which date field the month is extracted from or altering the field delimiter.

There might be no candidate stored data transformation in the set of candidate stored data transformations with a similarity score above a third threshold value, equal to or lower than the second threshold value, indicating that no programs of these candidate stored data transformations is usable, by itself, to perform the data transformation task, even with a delimiter or other minor adjustment. However, it might be possible to combine two or more stored data transformations, in a sequence, to achieve the desired result. For example, if one stored data transformation includes program1 to transform column A into column B, and another stored data transformation includes program2 to transform column B into column C, the two can be combined to execute a data transformation task calling for transforming column A into column C, by performing their respective programs in sequence, by executing program2(program1). Thus, an embodiment attempts match an individual column of the data transformation task with one or more individual columns of candidate stored data transformations, using similarity scores computed on an embedding corresponding to each column. If an individual column of the data transformation task is sufficiently similar to (i.e., has a similarity score above a threshold value, and is thus deemed to match) one or more individual columns of candidate stored data transformations, an embodiment retrieves one or more programs corresponding to matching candidate stored data transformation, and generates a generated data transformation program by assembling the programs into a sequence to implement the data transformation task.

An embodiment provides a generated data transformation program, along with one or more samples of the program's execution on data in the data transformation task, to a user for approval. Another embodiment omits the user approval.

If the user approves, or if the user approval is being skipped, an embodiment performs a data transformation task by modifying a plurality of records described by the data transformation task into a second plurality of records according to the generated data transformation program. An embodiment also adds data of the data transformation task, including the generated program, to the stored data transformations for future reuse on another data transformation task.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as module 200 implementing semantically similar historical example based data transformation. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
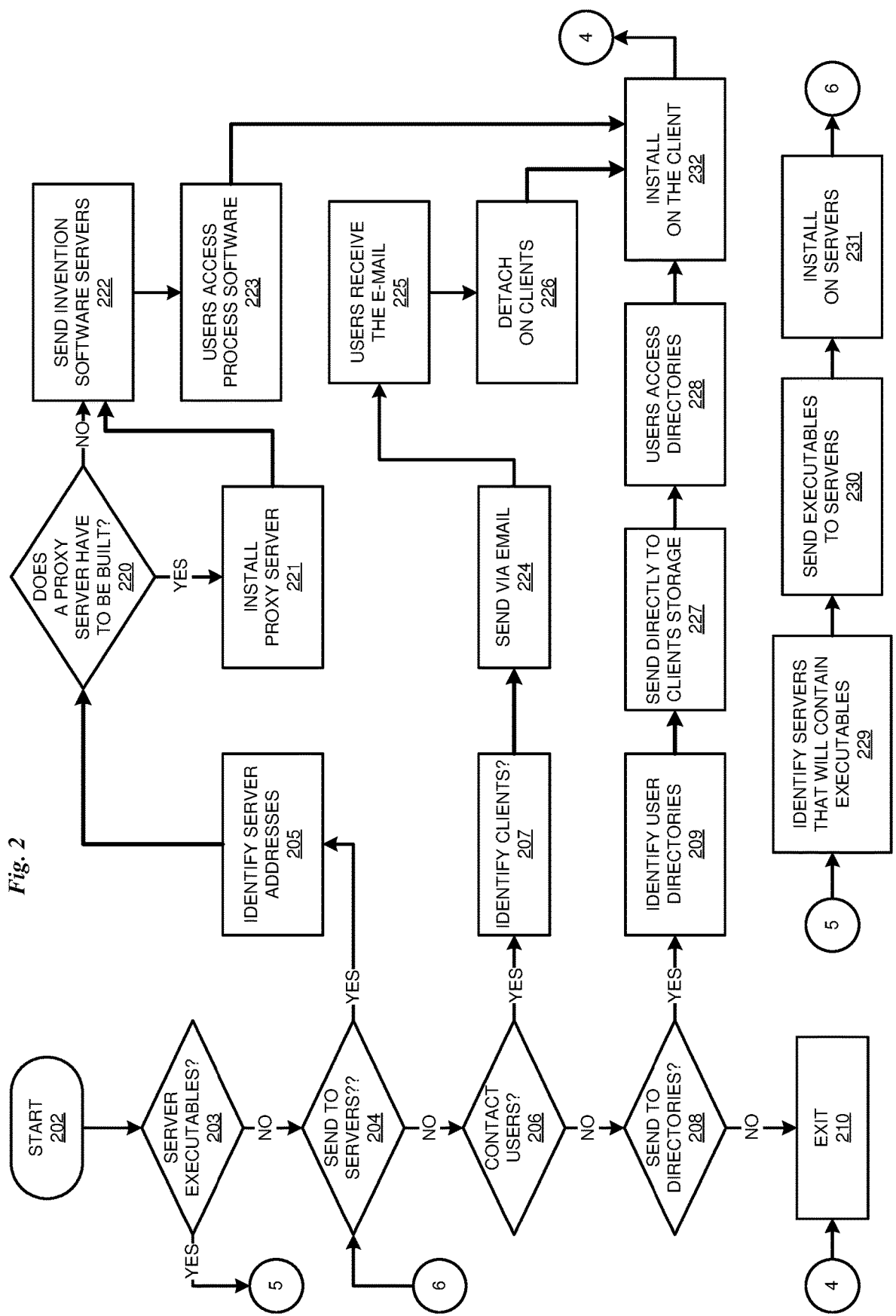
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing semantically similar historical example based data transformation may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
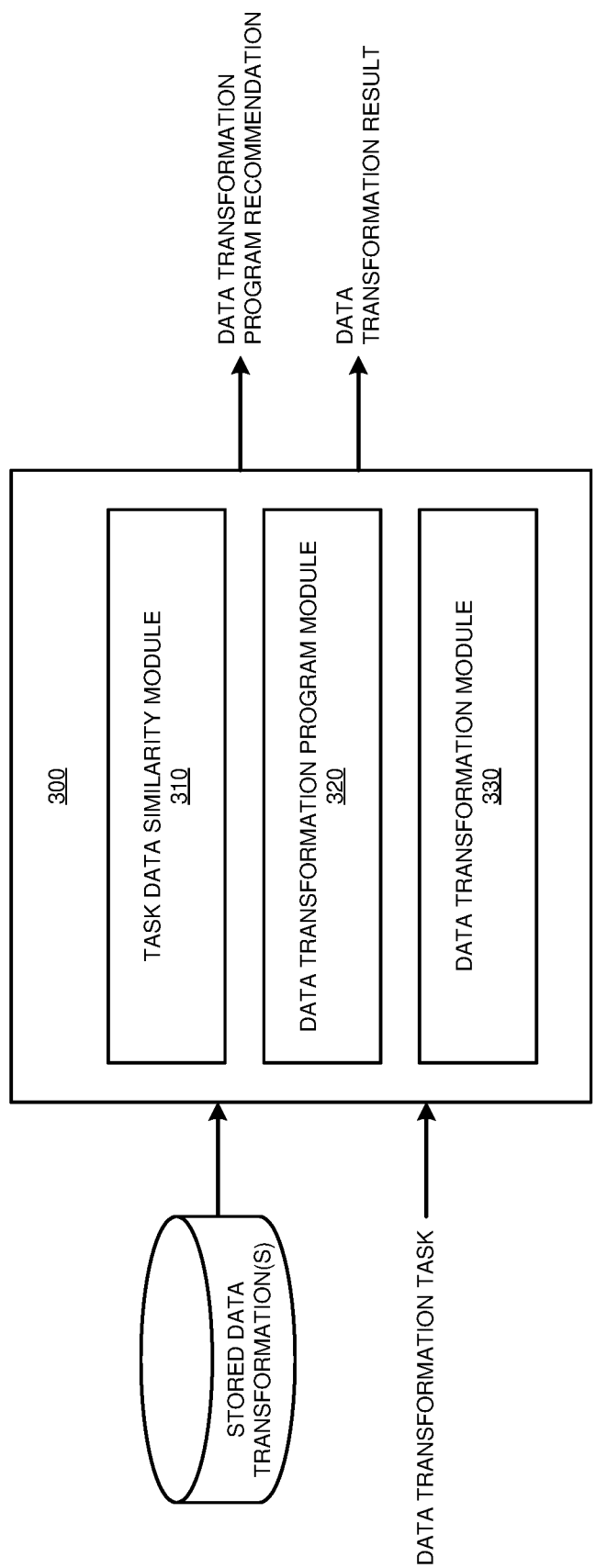
FIG. 3 depicts a block diagram of an example configuration for semantically similar historical example based data transformation in accordance with an illustrative embodiment.

With reference to FIG. 3, this figure depicts a block diagram of an example configuration for semantically similar historical example based data transformation in accordance with an illustrative embodiment. Application 300 is the same as application 200 in FIG. 1.

In the illustrated embodiment, application 300 has access to stored data transformations, for use as historical examples. A stored data transformation includes a stored data transformation program, instructions for executing a data transformation from a first data format to a second data format. A stored data transformation also includes metadata of the data transformation, such as one or more of the name, text description, or fingerprint of the columns that are the subject of the transformation, or samples (i.e., examples) of the transformation. For example, if a stored data transformation is to extract a city name from a meeting address, the source column name might be "event" and the target column name might be "city". For the same example, the source column description might be "event address" and the target column name might be "city where event will occur". A fingerprint is a pattern or template of the data stored in a particular column. For example, a column holding dates might have a fingerprint of "DD/MM/YYYY" or "MM/DD/YYYY". Other metadata is also possible.

Task data similarity module 310 uses a presently available embedding technique to represent the metadata, or a particular type of metadata, of a stored data transformation, with one or more embeddings. An embedding is a multidimensional numerical representation of a portion of data. Presently available embedding techniques, such as word2vec and the like, are trained to generate an embedding correspond to a word or group of words. The more similar two embeddings are to each other, as measured by closeness in a vector space, the more semantically similar the word or words corresponding to each embedding are to each other. For example, the embeddings corresponding to "cat" and "kitten" might be more similar to each other than the embeddings corresponding to "cat" and "desk", because a cat and a kitten are considered more semantically similar to each other than a cat and a desk are. One presently available technique for measuring embedding similarity is cosine similarity. Other embedding similarity measurement techniques are also possible.

Module 310 forms clusters of sufficiently similar embeddings representing metadata, or a particular type of metadata, of stored data transformations. One implementation of module 310 forms clusters of sufficiently similar embeddings in multiple embedding spaces, each corresponding to a particular type of metadata, of stored data transformations. One example implementation of module 310 might use embedding spaces each corresponding to one of the name, text description, fingerprint of the columns of stored data transformations, and samples.

In the illustrated embodiment, application 300 receives a data transformation task to be performed, using one or more stored data transformations as examples. The data transformation task includes metadata of the data transformation, such as one or more of the name, text description, or fingerprint of the columns that are the subject of the transformation, or samples of the desired transformation.

Module 310 uses a presently available embedding technique to represent the metadata, or a particular type of metadata, of a data transformation task, with one or more embeddings. Typically, module 310 uses the same embedding technique on both the stored data transformations and the data transformation task, so that the resulting embeddings can be compared to each other.

Module 310 computes a plurality of similarity scores. Each similarity score measures a similarity of task data of a data transformation task to data of a stored data transformation. In one implementation of module 310, each similarity score measures a similarity of a metadata embedding of a data transformation task to a metadata embedding of one or a cluster of stored data transformations. In one implementation of module 310, each similarity score measures a similarity of a particular type of metadata embedding (e.g., a name, text description, fingerprint of the columns that are the subject of the transformation, or samples) of a data transformation task to a corresponding embedding of one or a cluster of stored data transformations. In one implementation of module 310, if a similarity score to a cluster of stored data transformations is above a threshold value, the implementation identifies one or more stored data transformations within the cluster that are most similar to the data transformation task, and adds the identified stored data transformations to a set of candidate stored data transformations. In another implementation of module 310, if a similarity score to each of more than one cluster of stored data transformations is above a threshold value, the implementation identifies one or more stored data transformations within each cluster that are most similar to the data transformation task, and adds the identified stored data transformations to a set of candidate stored data transformations. Another implementation of module 310 does not use clusters, and uses the similarity scores to identify one or more stored data transformations within each cluster that are most similar to the data transformation task, and adds the identified stored data transformations to a set of candidate stored data transformations.

Module 310 ranks the set of candidate stored data transformations according to one or more ranking schemes. For example, one ranking scheme might rank candidate stored data transformations according to their name similarity, another ranking scheme might rank candidate stored data transformations according to their text description similarity, another ranking scheme might rank candidate stored data transformations according to their fingerprint similarity, and another ranking scheme might rank candidate stored data transformations according to their sample similarity. If there are multiple ranking schemes, module 310 aggregates the rankings into a combined ranked set of candidate stored data transformations. One implementation of module 310 aggregates the rankings into a combined ranked set of candidate stored data transformations by computing a weighted sum of the individual rankings, or by computing a weighted sum of the individual embedding-specific similarity scores for a candidate stored data transformation and ranking the candidate stored data transformations according to each transformation's corresponding weighed sum.

Data transformation program module 320 generates a generated data transformation program from a candidate stored data transformation in the set of candidate stored data transformations. In particular, there might be only one candidate stored data transformation in the set of candidate stored data transformations with a similarity score above a highest threshold value, indicating that this candidate stored data transformation's program is usable to perform the data transformation task. In this case, module 320 uses the candidate stored data transformation's program as the generated data transformation program.

There might be more than one candidate stored data transformation in the set of candidate stored data transformations with a similarity score above a second threshold value, equal to or lower than the first threshold value, indicating that the programs of these candidate stored data transformations are usable to perform the data transformation task with a delimiter or other minor adjustment. For example, there might be two candidate stored data transformations that extract a month from a date, but in one the month precedes the day of the month and in the other the month-day order is reversed. In this case, module 320 uses an adjusted version of one of the candidate stored data transformation's program as the generated data transformation program. As another example, there might be two candidate stored data transformations that extract a month from a date, but in one slashes are used to delimit fields within the date, and in the other spaces are used to delimit fields within the date. In this case, module 320 uses an adjusted version of one of the candidate stored data transformation's program as the generated data transformation program—for example, by changing which date field the month is extracted from or altering the field delimiter.

There might be no candidate stored data transformation in the set of candidate stored data transformations with a similarity score above a third threshold value, equal to or lower than the second threshold value, indicating that no programs of these candidate stored data transformations is usable, by itself, to perform the data transformation task, even with a delimiter or other minor adjustment. However, it might be possible to combine two or more stored data transformations, in a sequence, to achieve the desired result. For example, if one stored data transformation includes program1 to transform column A into column B, and another stored data transformation includes program2 to transform column B into column C, the two can be combined to execute a data transformation task calling for transforming column A into column C, by performing their respective programs in sequence, by executing program2(program1). Thus, module 320 attempts to match an individual column of the data transformation task with one or more individual columns of candidate stored data transformations, using similarity scores computed on an embedding corresponding to each column. If an individual column of the data transformation task is sufficiently similar to (i.e., has a similarity score above a threshold value, and is thus deemed to match) one or more individual columns of candidate stored data transformations, module 320 retrieves one or more programs corresponding to matching candidate stored data transformation, and generates a generated data transformation program by assembling the programs into a sequence to implement the data transformation task.

Module 320 provides a generated data transformation program, along with one or more samples of the program's execution on data in the data transformation task, to a user for approval. Another implementation of module 320 omits the user approval.

If the user approves, or if the user approval is being skipped, data transformation module 330 performs a data transformation task by modifying a plurality of records described by the data transformation task into a second plurality of records according to the generated data transformation program. Module 330 also adds data of the data transformation task, including the generated program, to the stored data transformations for future reuse on another data transformation task.

Figure 4:
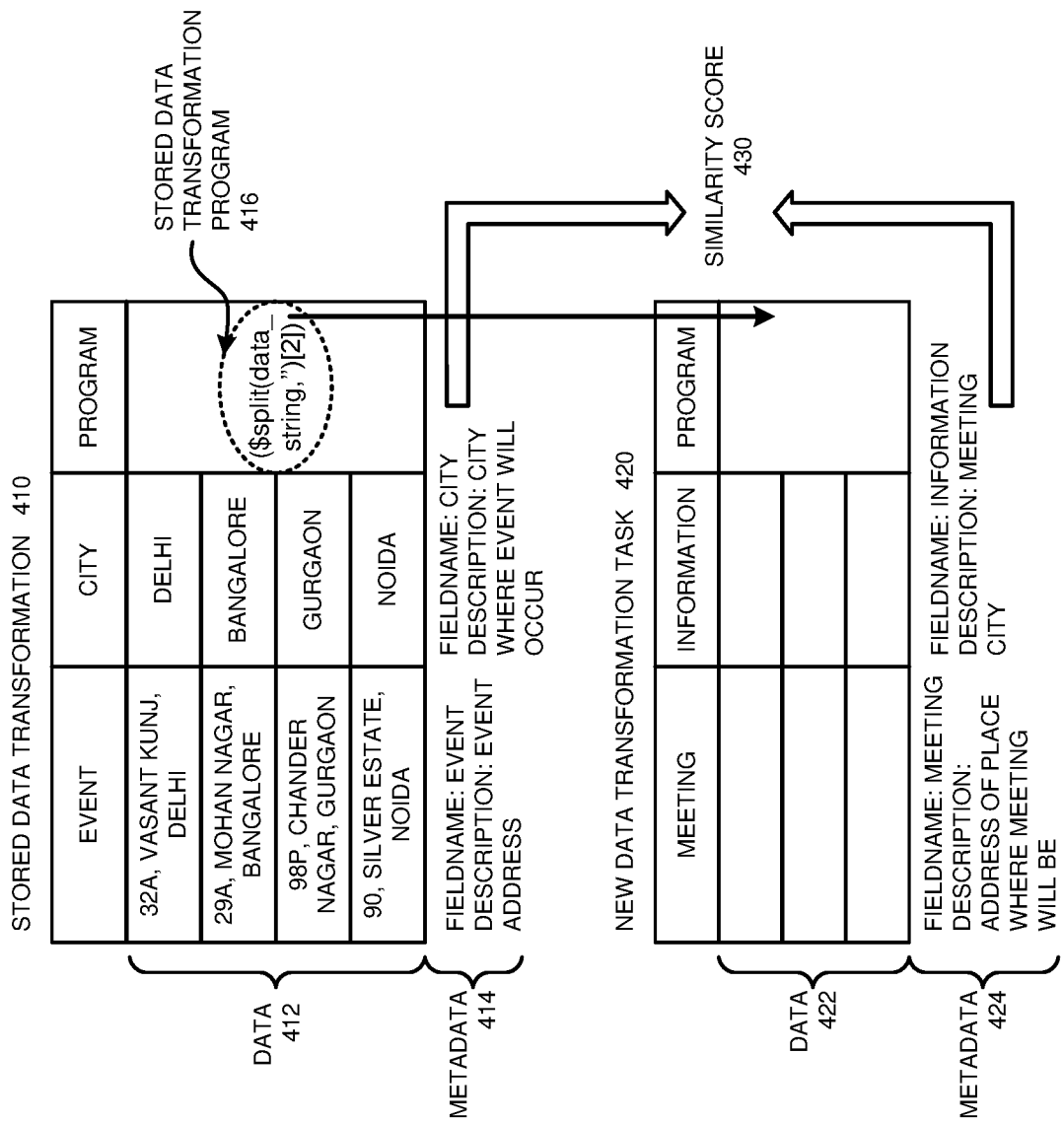
FIG. 4 depicts an example of semantically similar historical example based data transformation in accordance with an illustrative embodiment.

With reference to FIG. 4, this figure depicts an example of semantically similar historical example based data transformation in accordance with an illustrative embodiment. The example can be executed using application 300 in FIG. 3.

As depicted, stored data transformation 410 includes data 412, metadata 414, and stored data transformation program 416, used to transform data in the event column to data in the city column. New data transformation task 420 includes data 422 and metadata 424, and requires a program to transform data in the meeting column to data in the information column. Application 300 determines, based on similarity score 430 (in turn based on comparing respective embeddings for metadata 414 and metadata 424), that stored data transformation program 416 is usable as-is to perform new data transformation task 420.

Figure 5:
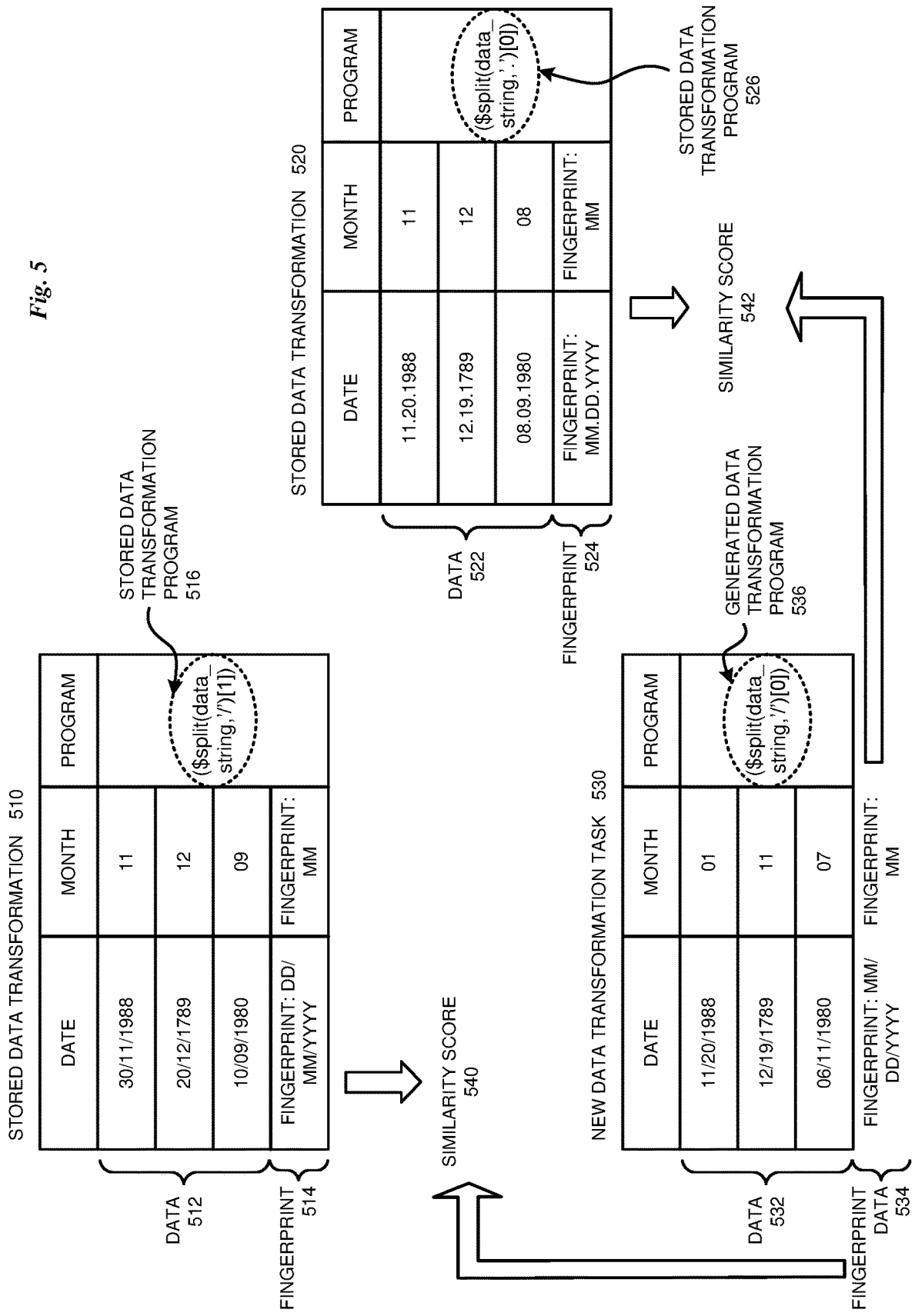
FIG. 5 depicts another example of semantically similar historical example based data transformation in accordance with an illustrative embodiment.

With reference to FIG. 5, this figure depicts another example of semantically similar historical example based data transformation in accordance with an illustrative embodiment. The example can be executed using application 300 in FIG. 3.

As depicted, stored data transformation 510 includes data 512, fingerprint 514, and stored data transformation program 516, used to transform data in the date column to data in the month column. Stored data transformation 520 includes data 522, fingerprint 524, and stored data transformation program 526, used to transform data in the date column to data in the month column. New data transformation task 530 includes data 532 and fingerprint data 534, and requires a program to transform data in the date column to data in the month column. Application 300 determines, based on similarity score 540 (in turn based on comparing respective embeddings for fingerprints 514 and 534) and similarity score 542 (in turn based on comparing respective embeddings for fingerprints 524 and 534), that stored data transformation program 526, adjusted to use the delimiter in stored data transformation program 516, is usable to perform new data transformation task 530, and generates generated data transformation program 536 accordingly.

Figure 6:
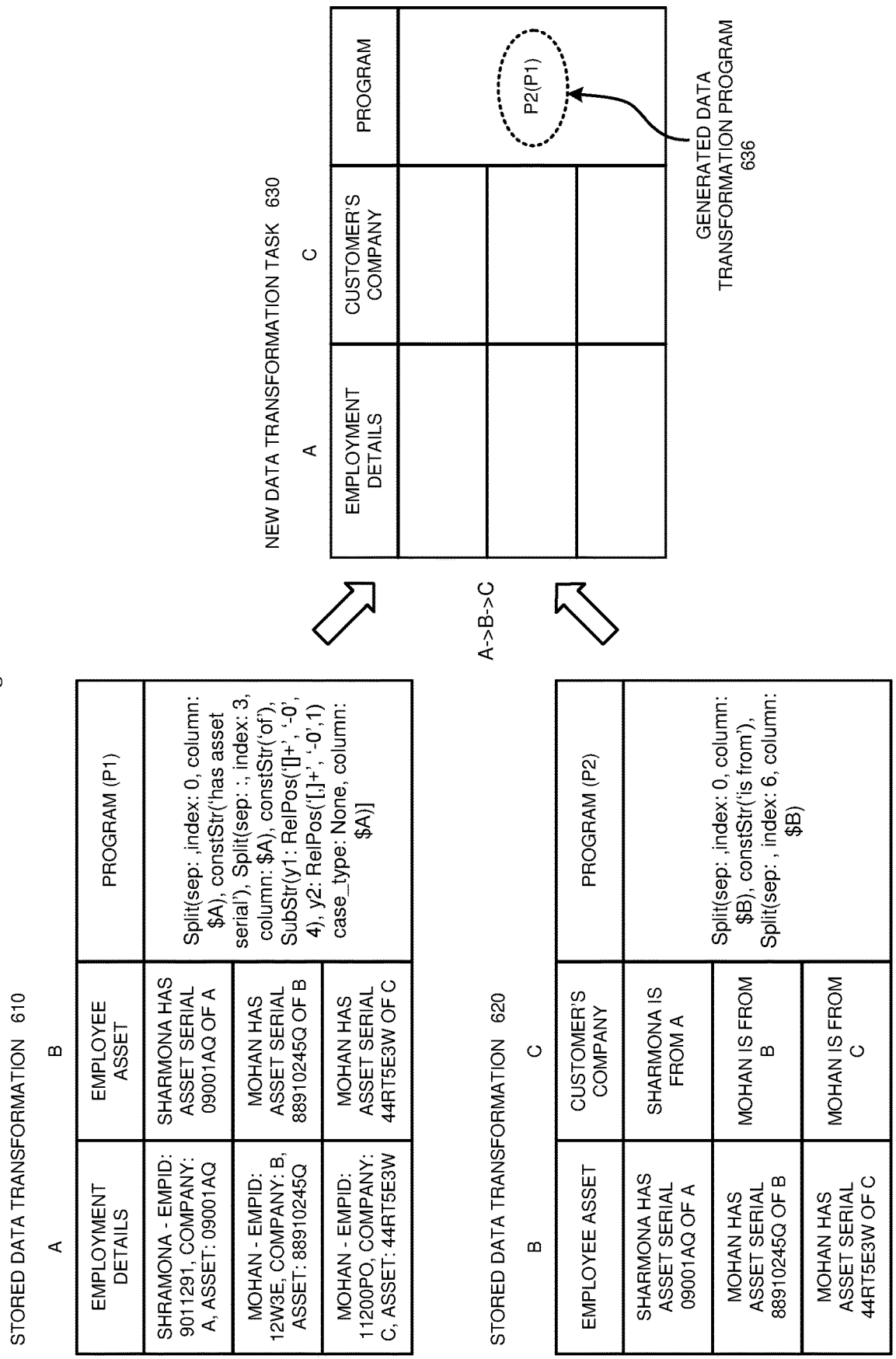
FIG. 6 depicts another example of semantically similar historical example based data transformation in accordance with an illustrative embodiment.

With reference to FIG. 6, this figure depicts another example of semantically similar historical example based data transformation in accordance with an illustrative embodiment. The example can be executed using application 300 in FIG. 3.

As depicted, stored data transformation 610 includes a program (P1) to transform data in column A to data in column B. Stored data transformation 620 includes a program (P2) to transform data in column B to data in column C. New data transformation task 630 includes columns A and C, and thus applying P1(P2) in sequence transforms column A data into column C data. As a result, application 300 generates generated data transformation program 636, applying P1(P2) in sequence.

Figure 7:
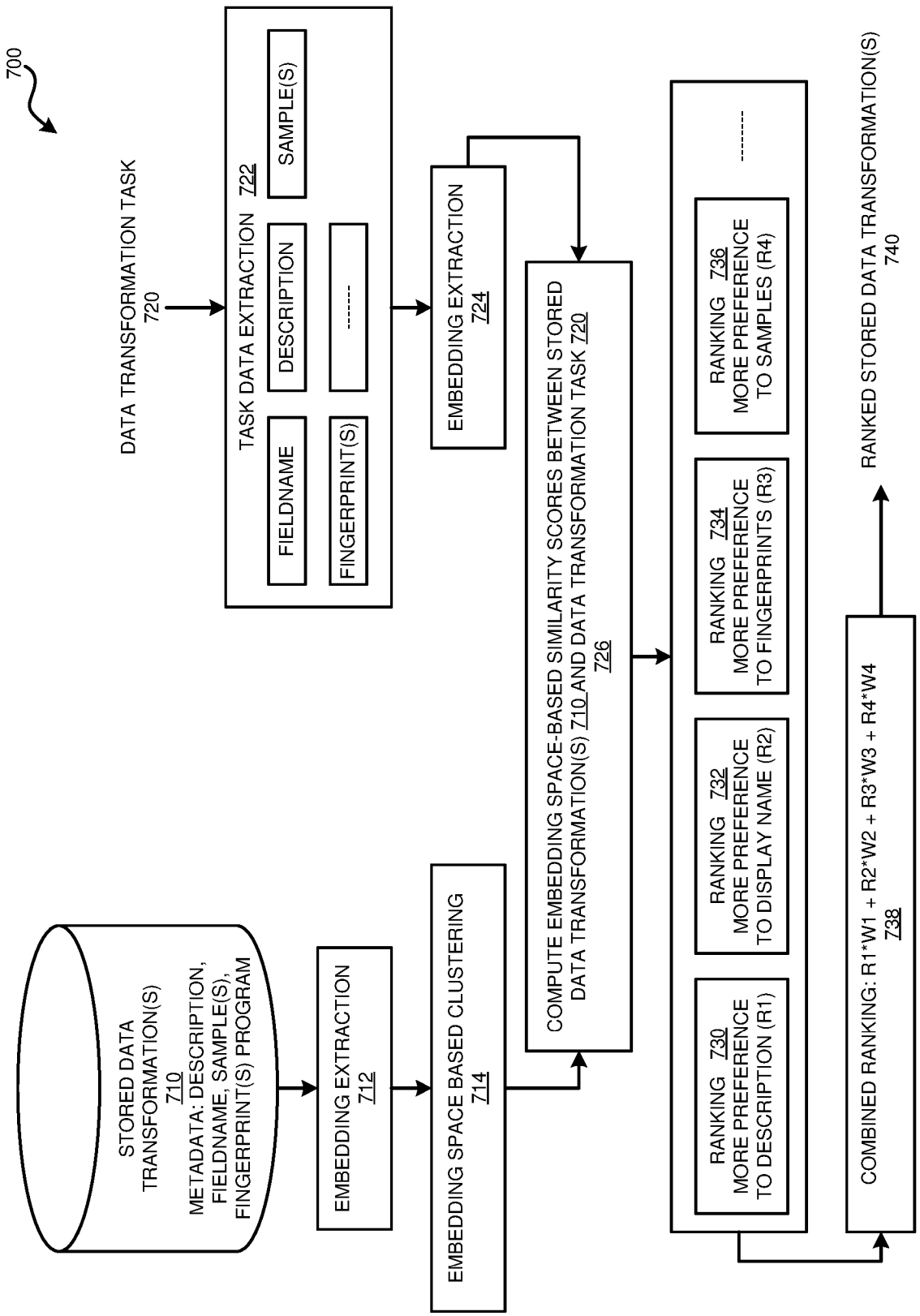
FIG. 7 depicts a flowchart of an example process for semantically similar historical example based data transformation in accordance with an illustrative embodiment.

With reference to FIG. 7, this figure depicts a flowchart of an example process for semantically similar historical example based data transformation in accordance with an illustrative embodiment. Process 700 can be implemented in application 300 in FIG. 3.

In block 712, application 300 uses a presently available embedding technique to represent the metadata, or a particular type of metadata, of a stored data transformation in stored data transformation(s) 710, with one or more embeddings. In block 714, application 300 forms clusters of sufficiently similar embeddings representing metadata, or a particular type of metadata, of stored data transformation(s)

710. In block 722, application 300 extracts metadata from data transformation task 720, and in block 724, application 300 uses a presently available embedding technique to represent the metadata, or a particular type of metadata, of data transformation task 720, with one or more embeddings. In block 726, application 300 computes similarity scores, each measuring a similarity of task data of data transformation task 720 to data of a stored data transformation in stored data transformation(s) 710. In blocks 730, 732, 734, and 736, application 300 ranks the set of candidate stored data transformations according to four ranking schemes. In block 738, application 300 aggregates the rankings into ranked stored data transformation(s) 740 by computing a weighted sum of the individual rankings, or by computing a weighted sum of the individual embedding-specific similarity scores for a candidate stored data transformation and ranking the candidate stored data transformations according to each transformation's corresponding weighed sum.

Figure 8:
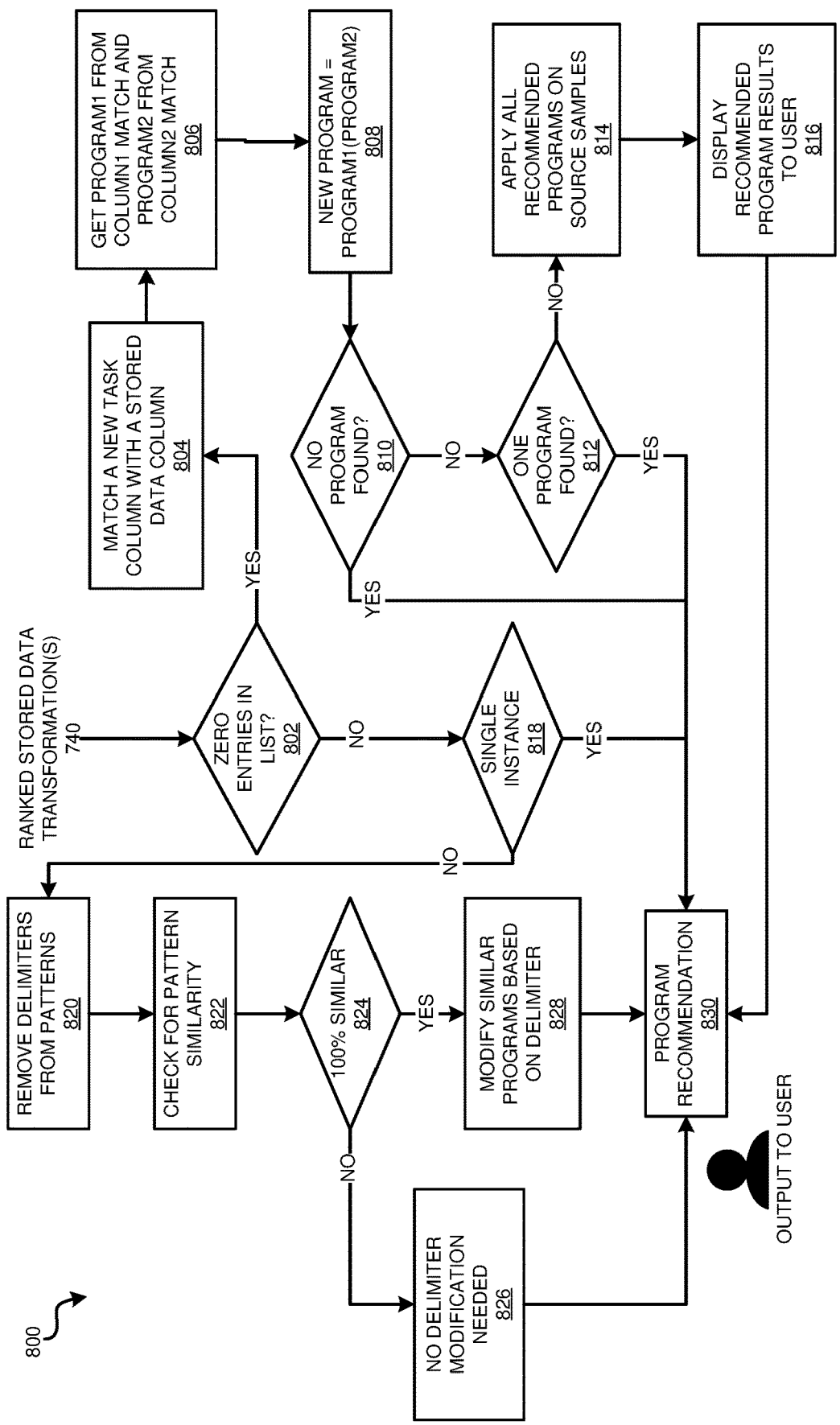
FIG. 8 depicts a flowchart of another example process for semantically similar historical example based data transformation in accordance with an illustrative embodiment.

With reference to FIG. 8, this figure depicts a flowchart of another example process for semantically similar historical example based data transformation in accordance with an illustrative embodiment. Process 800 can be implemented in application 300 in FIG. 3. Ranked stored data transformation(s) 740 is the same as ranked stored data transformation(s) 740 in FIG. 7.

In block 802, application 300 determines whether there are no candidate stored data transformation in the set of candidate stored data transformations with a similarity score above a third threshold value. If yes, ("YES" path of block 802), in block 804 application 300 attempts to match an individual column of the data transformation task with one or more individual columns of candidate stored data transformations, using similarity scores computed on an embedding corresponding to each column. If an individual column of the data transformation task is sufficiently similar to (i.e., has a similarity score above a threshold value, and is thus deemed to match) one or more individual columns of candidate stored data transformations, in block 806 application 300 retrieves one or more programs corresponding to matching candidate stored data transformation, and in block 808 generates a generated data transformation program by assembling the programs into a sequence to implement the data transformation task. In block 810, application 300 determines whether a program was found, and if not ("NO" path of block 810), in block 812 application 300 determines whether one program was found. If not ("NO" path of block 812), at least two programs were found, and in block 814 application 300 implements a generated data transformation program, and in block 816 application 300 displays sample results of the generated program to a user for approval.

If there is at least one candidate stored data transformation in the set of candidate stored data transformations with a similarity score above a threshold value, ("NO" path of block 802), in block 818 application 300 determines whether only one candidate stored data transformation in the set of candidate stored data transformations with a similarity score above a threshold value, indicating that this candidate stored data transformation's program is usable to perform the data transformation task. In this case, ("YES" paths of block 818, 810, and 812), in block 830 module 320 recommends the candidate stored data transformation's program (or no program, if none was found) as the generated data transformation program to a user.

If there is more than one candidate stored data transformation in the set of candidate stored data transformations with a similarity score above a threshold value ("NO" path of block 818), indicating that the programs of these candidate stored data transformations are usable to perform the data transformation task with a delimiter or other minor adjustment, in block 820 application 300 removes delimiters from candidate stored data transformations, and in block 822 checks for pattern similarity. If the patterns are identical ("YES" path of block 824), in block 828 application 300 modifies one or more of the candidate programs based on the delimiter, and in block 830 module 320 recommends the modified program as the generated data transformation program to a user. If the patterns are not identical ("NO" path of block 824), in block 826 no delimiter modification is required, and in block 830 module 320 recommends the unmodified program as the generated data transformation program to a user.

Figure 9:
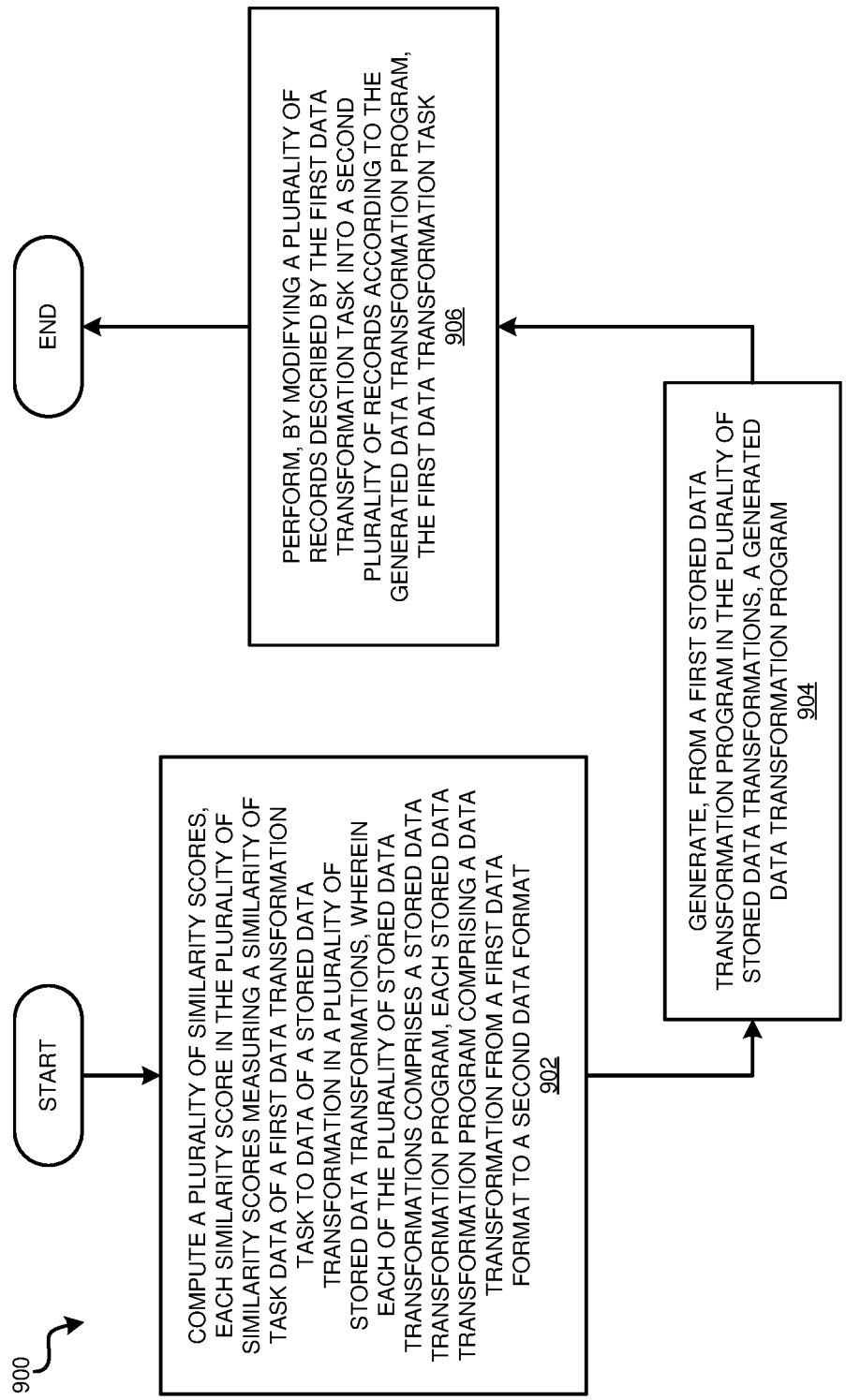
FIG. 9 depicts a flowchart of another example process for semantically similar historical example based data transformation in accordance with an illustrative embodiment.

With reference to FIG. 9, this figure depicts a flowchart of another example process for semantically similar historical example based data transformation in accordance with an illustrative embodiment. Process 900 can be implemented in application 300 in FIG. 3.

In the illustrated embodiment, at block 902, the process compute a plurality of similarity scores, each similarity score in the plurality of similarity scores measuring a similarity of task data of a first data transformation task to data of a stored data transformation in a plurality of stored data transformations, wherein each of the plurality of stored data transformations comprises a stored data transformation program, each stored data transformation program comprising a data transformation from a first data format to a second data format. In block 904, the process generates, from a first stored data transformation program in the plurality of stored data transformations, a generated data transformation program. In block 906, the process performs, by modifying a plurality of records described by the first data transformation task into a second plurality of records according to the generated data transformation program, the first data transformation task. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
enhancing accuracy of a feature extraction module configured to operate on a dataset, by automatic generating code of a generated data transformation program and data transformation of the dataset by execution of the code, the enhancing comprising—
representing using a first embedding technique, in a vector space, metadata of a stored data transformation in a plurality of stored data transformations as a set of stored embeddings, each stored embedding in the set comprising a multidimensional numerical representation of a portion of the metadata;
representing using the first embedding technique, and responsive to a data transformation task, metadata of the dataset in the vector space, as a set of first embeddings;
computing a plurality of similarity scores, each similarity score in the plurality of similarity scores being a computed distance in the vector space between a stored embedding from the set of stored embeddings and a corresponding first embedding from the set of first embeddings, wherein each of the plurality of stored data transformations comprises a stored data transformation program, each stored data transformation program comprising a data transformation from a first data format to a second data format;
ranking each of the plurality of stored data transformations, wherein the ranking is an aggregate of a plurality of weighted ranking schemes;
standardizing details associated with a first stored data transformation to match details associated with the first data transformation task, wherein the details comprise metadata, fingerprint, and description, and wherein the first stored data transformation is selected due to the ranking of each of the plurality of stored data transformations;
generating, by modifying from the plurality of stored data transformations a code of a first stored data transformation program, to form the code of the generated data transformation program, wherein the first stored data transformation program is selected due to a standardized first stored data transformation, the modifying causing an increase in a pattern similarity by removing a delimiter; and
executing the code of the generated data transformation program, the executing causing a modification of a plurality of records described by the first data transformation task into a second plurality of records according to the generated data transformation program.

2. The computer-implemented method of claim 1, wherein the generated data transformation program comprises the first stored data transformation program.

3. The computer-implemented method of claim 1, wherein the generated data transformation program comprises a sequence of stored data transformation programs including the first stored data transformation program.

4. The computer-implemented method of claim 3, wherein the sequence is generated responsive to determining that there are no stored data transformations with similarity scores above a second threshold value.

5. The computer-implemented method of claim 3, wherein the sequence comprises stored data transformation programs identified according to a similarity of a first column description of data of a first stored data transformation to a second column description of data of a second stored data transformation, the first stored data transformation comprising the first stored data transformation program in the sequence, the second stored data transformation comprising a second stored data transformation program in the sequence.

6. The computer-implemented method of claim 1, wherein the generated data transformation program comprises an adjustment of the first stored data transformation program.

7. The computer-implemented method of claim 6, wherein the adjustment is performed responsive to determining that there are at least two stored data transformations with similarity scores above a third threshold value, the at least two stored data transformations including the first stored data transformation program.

8. A computer program product comprising one or more non-transitory computer readable storage media, and program instructions collectively stored on the one or more computer readable storage media, the program instructions executable by a processor to cause the processor to perform operations comprising:

enhancing accuracy of a feature extraction module configured to operate on a dataset, by automatic generating code of a generated data transformation program and data transformation of the dataset by execution of the code, the enhancing comprising— representing using a first embedding technique, in a vector space, metadata of a stored data transformation in a plurality of stored data transformations as a set of stored embeddings, each stored embedding in the set comprising a multidimensional numerical representation of a portion of the metadata;

representing using the first embedding technique, and responsive to a data transformation task, metadata of the dataset in the vector space, as a set of first embeddings;

computing a plurality of similarity scores, each similarity score in the plurality of similarity scores being a computed distance in the vector space between a stored embedding from the set of stored embeddings and a corresponding first embedding from the set of first embeddings, wherein each of the plurality of stored data transformations comprises a stored data transformation program, each stored data transformation program comprising a data transformation from a first data format to a second data format;

ranking each of the plurality of stored data transformations, wherein the ranking is an aggregate of a plurality of weighted ranking schemes;

standardizing details associated with a first stored data transformation to match details associated with the first data transformation task, wherein the details comprise metadata, fingerprint, and description, and wherein the first stored data transformation is selected due to the ranking of each of the plurality of stored data transformations;

generating, by modifying from the plurality of stored data transformations a code of a first stored data transformation program, to form the code of the generated data transformation program, wherein the first stored data transformation program is selected due to a standardized first stored data transformation, the modifying causing an increase in a pattern similarity by removing a delimiter; and executing the code of the generated data transformation program, the executing causing a modification of a plurality of records described by the first data transformation task into a second plurality of records according to the generated data transformation program.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

11. The computer program product of claim 8, wherein the generated data transformation program comprises the first stored data transformation program.

12. The computer program product of claim 8, wherein the generated data transformation program comprises a sequence of stored data transformation programs including the first stored data transformation program.

13. The computer program product of claim 12, wherein the sequence is generated responsive to determining that there are no stored data transformations with similarity scores above a second threshold value.

14. The computer program product of claim 12, wherein the sequence comprises stored data transformation programs identified according to a similarity of a first column description of data of a first stored data transformation to a second column description of data of a second stored data transformation, the first stored data transformation comprising the first stored data transformation program in the sequence, the second stored data transformation comprising a second stored data transformation program in the sequence.

15. The computer program product of claim 8, wherein the generated data transformation program comprises an adjustment of the first stored data transformation program.

16. The computer program product of claim 15, wherein the adjustment is performed responsive to determining that there are at least two stored data transformations with similarity scores above a third threshold value, the at least two stored data transformations including the first stored data transformation program.

17. A computer system comprising a processor and one or more non-transitory computer readable storage media, and program instructions collectively stored on the one or more computer readable storage media, the program instructions executable by the processor to cause the processor to perform operations comprising:
  enhancing accuracy of a feature extraction module configured to operate on a dataset, by automatic generating code of a generated data transformation program and data transformation of the dataset by execution of the code, the enhancing comprising—
  representing using a first embedding technique, in a vector space, metadata of a stored data transformation in a plurality of stored data transformations as a set of stored embeddings, each stored embedding in the set comprising a multidimensional numerical representation of a portion of the metadata;
  representing using the first embedding technique, and responsive to a data transformation task, metadata of the dataset in the vector space, as a set of first embeddings;
  computing a plurality of similarity scores, each similarity score in the plurality of similarity scores being a computed distance in the vector space between a stored embedding from the set of stored embeddings and a corresponding first embedding from the set of first embeddings, wherein each of the plurality of stored data transformations comprises a stored data transformation program, each stored data transformation program comprising a data transformation from a first data format to a second data format;
  ranking each of the plurality of stored data transformations, wherein the ranking is an aggregate of a plurality of weighted ranking schemes;
  standardizing details associated with a first stored data transformation to match details associated with the first data transformation task, wherein the details comprise metadata, fingerprint, and description, and wherein the first stored data transformation is selected due to the ranking of each of the plurality of stored data transformations;
  generating, by modifying from the plurality of stored data transformations a code of a first stored data transformation program, to form the code of the generated data transformation program, wherein the first stored data transformation program is selected due to a standardized first stored data transformation, the modifying causing an increase in a pattern similarity by removing a delimiter; and
  executing the code of the generated data transformation program, the executing causing a modification of a plurality of records described by the first data transformation task into a second plurality of records according to the generated data transformation program.

18. The computer system of claim 17, wherein the generated data transformation program comprises the first stored data transformation program.

19. The computer system of claim 17, wherein the generated data transformation program comprises a sequence of stored data transformation programs including the first stored data transformation program.

20. The computer system of claim 19, wherein the sequence is generated responsive to determining that there are no stored data transformations with similarity scores above a second threshold value.

* * * * *